US010586262B2

(12) United States Patent
Scoggins

(10) Patent No.: US 10,586,262 B2
(45) Date of Patent: Mar. 10, 2020

(54) AUTOMATED SYSTEM AND METHOD FOR THE CUSTOMIZATION OF FASHION ITEMS

(71) Applicant: PARAMOUNT JEWELS, LLC, New York, NY (US)

(72) Inventor: Lindsey Scoggins, New York, NY (US)

(73) Assignee: PARAMOUNT JEWELS, LLC, New York, NY (US)

( * ) Notice: Subject to any disclaimer, the term of this patent is extended or adjusted under 35 U.S.C. 154(b) by 755 days.

(21) Appl. No.: 15/035,130

(22) PCT Filed: Nov. 11, 2014

(86) PCT No.: PCT/US2014/064909
§ 371 (c)(1),
(2) Date: May 6, 2016

(87) PCT Pub. No.: WO2015/070192
PCT Pub. Date: May 14, 2015

(65) Prior Publication Data
US 2016/0275585 A1    Sep. 22, 2016

Related U.S. Application Data

(60) Provisional application No. 61/902,435, filed on Nov. 11, 2013.

(51) Int. Cl.
*G06Q 30/00* (2012.01)
*G06Q 30/06* (2012.01)

(52) U.S. Cl.
CPC ..... *G06Q 30/0621* (2013.01); *G06Q 30/0601* (2013.01); *G06Q 30/0611* (2013.01);
(Continued)

(58) Field of Classification Search
CPC ................. G06Q 30/0601–0645; G06Q 30/08
(Continued)

(56) References Cited

U.S. PATENT DOCUMENTS

2005/0227862 A1    10/2005   Guhde et al.
2011/0153463 A1*    6/2011   Lovelace ............... G06Q 10/10
                                                                 705/27.1
(Continued)

FOREIGN PATENT DOCUMENTS

KR    10-2001-0094168    10/2001
KR    10-2009-0000632    1/2009

OTHER PUBLICATIONS

23 Paws and Me, Pet Memorial Jewelry for Any Budget, Aug. 26, 2012, petslady.com, accessed at [http://petslady.com/article/pet-memorial-jewelry-any-budget] accessed on Dec. 4, 2019. (Year: 2012).*
(Continued)

*Primary Examiner* — Jeffrey A. Smith
*Assistant Examiner* — Lindsey B Smith
(74) *Attorney, Agent, or Firm* — Andrew F. Young, Esq.; Lackenbach Siegel, LLP

(57) ABSTRACT

An customization system and method in which a user can establish user indicia content, such as an image or text (e.g., a map, picture, address, name, etc.), onto a user selected indicia surface of an item or product, such as an item of jewelry or textile, and then view the customized product before purchasing the customized product. The item of jewelry may be selected, design, viewed and ordered or purchased automatically through the computer interface where the user interface and indicia designation creates both a visualization mask and indicia manufacturing designation code without further operator input. Such an automated system and method may include a selection module, a design module, an editing module, and a purchasing module for allowing a user to design and purchase an customized and/or personalized jewelry item having a unique engraving such as a map of a significant location with a gem stone as the specific identifying marker all according to a consumer's
(Continued)

input. Users may navigate through various user interface screens or modules to view and select jewels and jewelry for use in their design. The jewels and jewelry of interest may be arranged together on a virtual screen so that users may view, compare and arrange the jewels and jewelry to aid in the selection and design process. The action of creating, selecting, and designating indicia content on an item creates manufacturing instructions for direct transmission to a manufacturer absent further modification.

7 Claims, 9 Drawing Sheets

(52) U.S. Cl.
CPC ..... *G06Q 30/0633* (2013.01); *G06Q 30/0635* (2013.01); *G06Q 30/0639* (2013.01); *G06Q 30/0641* (2013.01); *G06Q 30/0643* (2013.01)

(58) Field of Classification Search
USPC ................................................ 705/26.1–27.2
See application file for complete search history.

(56) References Cited

U.S. PATENT DOCUMENTS

2011/0313878 A1* 12/2011 Norman ................. G06Q 30/06
705/26.5
2013/0173040 A1 7/2013 Wells et al.

OTHER PUBLICATIONS

PCT/US2014/064909, International Search Report dated Feb. 13, 2015, 3 pages—English.
PCT/US2014/064909, Written Opinion dated Feb. 13, 2015, 9 pages—English.

* cited by examiner

FIG. 4

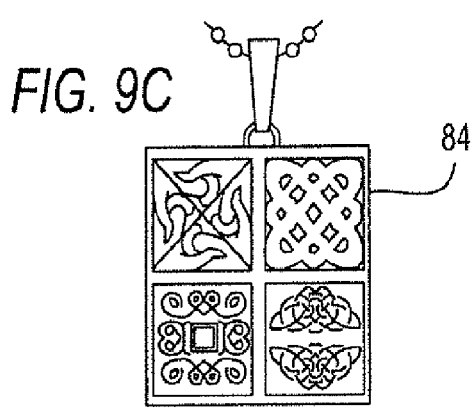
FIG. 9C
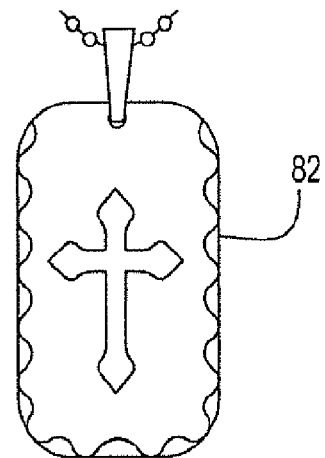
FIG. 9B
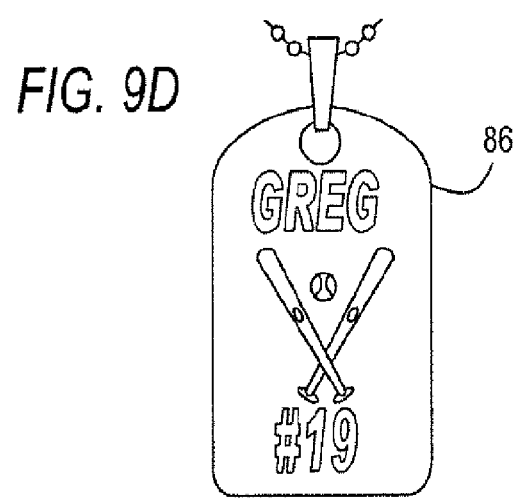
FIG. 9D
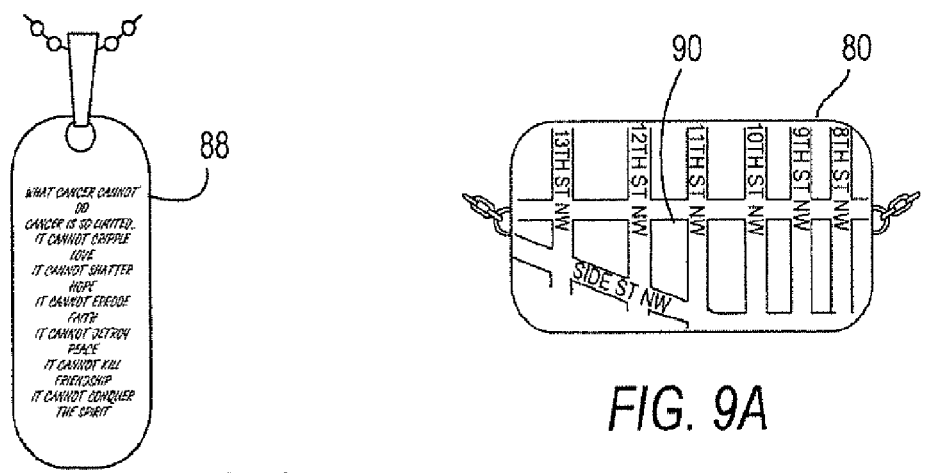
FIG. 9A
FIG. 9E

AUTOMATED SYSTEM AND METHOD FOR THE CUSTOMIZATION OF FASHION ITEMS

CROSS REFERENCE TO RELATED APPLICATIONS

This application relates to and claims priority from PCT Ser. No. PCT/US2014/064909 filed Nov. 11, 2014, the entire contents of which is incorporated by reference, which further claims priority, from U.S. Prov. Ser. No. 61/902,435 filed Nov. 11, 2013, the entire contents of which are incorporated fully by reference.

FIGURE SELECTED FOR PUBLICATION

FIG. 4

BACKGROUND OF THE INVENTION

Field of the Invention

The present invention relates generally to a system and method for selection, design, manufacture and sale customized products having indicia surfaces, including but not limited to fashion items or jewelry. More specifically, the invention relates to a computer-based method and system and interface for customer-driven design and manufacture of customized jewelry items, which combines key elements of computer aided design methodologies to allow a user to personalize or customize jewelry items with creation of direct machine an engraving of, for example, a geographical location or street map of a particular significant location to a user, and a gem stone (e.g., optional feature motif) to mark or identify the specific address or location.

Description of the Related Art

The customization of fashion items or durable goods products is a desirable characteristic that many retail markets would enjoy being able to broadly utilize and many consumers would enjoy broadening their product selection and bringing what they buy closer to what they want. Unfortunately sales, distribution and manufacturing systems designed to deliver mass-manufactured goods to consumers and/or job-shops that do custom manufacturing are not positioned to effectively deliver individualized mass-customization, placing custom-designed products out of the reach of consumers. Additionally, the machines, methods and labor are ineffective at delivering customization cost-effectively. An example is the manufacture of class rings or other jewelry. The diversity of these products is defined by the selection of a fixed number of molds and tooling used to inject wax which is used to cast the final product. A manufacturer cannot provide an infinite product selection or face the challenge of also producing and storing an infinite number of molds and tooling parts.

The customization characteristics desired by individuals are diverse and therefore, the method is applicable to a wide array of products. For example; a customer may desire a custom-designed broach or ring that contains a representation of a family crest or insignia. To obtain this custom product requires specialized training. Designing these products and having them individually manufactured is expensive and, the equipment necessary is not normally available to the general public nor is the operating procedure of the equipment. Therefore, customization options to consumers are again limited and access to customization of products is difficult. The result is that individual needs and or desires are not always met and customers therefore settle for less than what they wanted or desired.

Computer-based networks, access systems, websites, databases, process controllers, and related processing modules and processing speeds, etc. have reached a sufficient level of performance to provide consumers with the ability to drive changes to products themselves in many aspects. Consumer capabilities to understand such systems have also reached a level sufficient for consumers to realistically be involved in at least some aspects of a design process, for example those that do not cause risk to customers or liability to a manufacturers, as defined by constraints preventing a customer from violating the constraints during design for personalization or customization.

Jewelry design normally involves the creation of individualized jewelry items in fixed multiples. For example, a diamond necklace may be designed to have a wide variety of numbers of diamonds, diamond shapes, diamond quality, diamond placements or orientations, chain lengths, chain designs or color. An appropriate selection of these or other characteristics can result in a necklace which is highly attractive to certain individual customers and for which those customers may pay a premium to express themselves through the jewelry design. Generally, to create such a design, a highly skilled artisan assimilates information concerning the design, including specific information from one or more potential purchasers. The designer then creates a feature design and lays that feature design out on a neckline (or other feature path) a number of times, each time re-sizing and re-orienting the feature to reflect the feature placement on the feature path. The difficulty with this process is that re-sizing and re-orienting a single or a multiple feature item a number of times is a time consuming and inefficient process. Such a conventional process does not provide the designer with the freedom to quickly create multiple designs.

Furthermore, because the conventional design process does not enable a designer to quickly create multiple designs, design changes suggested by individual customers or other persons (e.g., sales personnel) having information to be used in the design are generally not directly incorporated into the design process. This is a problem because the more involved a customer is in the creation of the design, the more attached the customer may become to the resulting item of jewelry. Similarly, the more involved sales personnel are in creating a design, the more customer information is incorporated into the design and the more the sales person will be involved in selling that specific design.

SUMMARY OF THE INVENTION

In view of the foregoing needs, the present invention is directed to method and system for user/customer selection, design, sale and directed manufacture of customized/personalized jewelry items through a streamlined and/or automated or semi-automated process combining computers, a customization interface including an interactive controls suite for the purpose of allowing a user/customer to personalize or customize a fashion item or product, whereby the user/customer is connected directly to the design system and design controlling instructions through a website or web portal for the purpose of providing design feedback and pre-purchase visualization to the user/customer accessing the system through said website or web portal. Also, embodiments of the present invention improve operational performance in a design, sale and manufacturing systems for the design, manufacture and sale of a wide variety of customized fashion items or products which can be adequately defined by one or more computer-based design and design implementation methods.

According to one embodiment of the present invention, the method for producing a customized jewelry item having a geographical location as its engraving may be carried out by a computer-based system which includes a computer, a software-based modeling engine (e.g., a CAD engine), input/output controls to the modeling engine, a viewer engine, a database or file system and a production routing and scheduling system interconnected with the design or modeling system. Here, a customer preferably directly interfaces with the digital representation of their intended item. In essence, the customer is looking through an internet portal at her uniquely designed product and can interact with that product throughout the design process of creating a desired indicia surface thereon. Any changes made by the user that occur to the item become unique indicia facets of the particular final product the user/customer is building or creating for herself. Optionally, the system may permit a plurality of customers to interface simultaneously with the system to create a particular item or items.

According to another aspect of the present invention, there is provided A method and system is provided for designing and producing a customized jewelry item from a customer's home computer or mobile device. Preferably, a base model corresponding to the jewelry item is displayed to the customer, whereupon one or more custom modifications are provided by the customer. A modified model corresponding to the modified jewelry item is prepared and displayed to the customer. Once acceptance of the product design is made and confirmation to produce the modified object is received, data corresponding to the modified model is transmitted to a manufacturing device, module or system for production of the item according to the data, such that the item made corresponds directly to the modified model. Such a method and apparatus provides the direct engraving of finely detailed jewelry items and other objects. One method of engraving uses digitally scanned images converted in a computer to a bitmap or other file which may be selected by a customer and optionally edited by the user. The engraving machine may be controlled by a person or a computer interface according to the specifications established or selected by the customer. A substantial increase in integrity, accuracy, ease of use and cost savings results, as the invention eliminates time consuming, laborious and unpleasant steps in prior techniques or procedures. The elimination of certain steps also allows a much faster turnaround, an advantage for time sensitive purchases.

According to another aspect of the present invention, it will be understood that the proposed system and method enables creation of a unique indicia surface on a user selected item (for example, jewelry), but is not so limited. The user selected item may be a non-jewelry item such as a pen, credit card surface, textile of any kind, glass wear, textile products (quilts, sheets, napkins, drapes, etc.), electronics, and other consumer accessories and consumer products almost without limit. The proposed system may select a product (of any desired kind) which shall have an indicia surface for receipt of the user designated indicia content and optionally the feature motif.

Another embodiment of the invention automates all or most of the post-design production operation and any necessary 'translations' from a user-order to a manufacturing-instruction for manufacturing devices; thereby removing most of the human factor requirements from the system (absent device set up and product removal) and thereby removing or minimizing the number of people involved within production environment and the potential errors in manufacturing. Removal of much of the human factor further optimizes the manufacturing process, maximizing productivity and minimizing labor needs and costs.

Another embodiment of the present invention provides a customizable consumer product or item having an indicia surface (e.g., a piece of jewelry, gift item, textile, leather good, printed matter, metal surface, wood, glass, clock or other desk item, watch, etc.) with any user designated indicia content, preferably an address, landmark, or other location in the world, selected by a user, for engraving on the indicia surface. For example, a user selects an address from a geospatial engine having a searchable address, or landmark (e.g., 'Statue of Liberty'), and instructs the manufacturer of the user's design choices and engraving information relative to that geospatial location. The system engraves the selected product (e.g., a 14 Karat gold plated pendant) with the selected location, including a gem stone. Examples of such locations may include a college attended, an engagement site, a wedding place, a desired destination, a championship game, a birthplace, etc. Alternatively, the direct instructions from the user selection may be directly transmitted to a printing system (any kind, ink jet etc.) for use on a textile (e.g., printing on a user-selected surface—pillow).

It is an aspect of the present invention to provide a method and apparatus to create, design, manufacture and sell a jewelry design and item.

It is another aspect of the present invention to provide a method and apparatus that automatically places selected design features onto a jewelry item.

It is still another aspect of the present invention to provide a method and apparatus that automatically places selected design features onto a jewelry item in three dimensions.

It is still another aspect of the present invention to provide a method and apparatus that enables a potential customer to participate in the jewelry selection, design and creation.

It is still a further aspect of the present invention to provide a method and apparatus having an interface that automatically arranges and orients the selected design features on a jewelry item according to characteristics specified by a potential customer.

It is yet another aspect of the present invention to provide aggregate resources in design, product development, and large scale manufacturing, in order to offer customized product designs and products.

It is still another aspect of the present invention to supply a full array of custom, made-to-order products each having an indicia surface encompassing all categories of fashion and bridal, including but not limited to jewelry, textiles, credit cards, glassware, electronic accessories, etc. for receipt of a user designed indicia content via any known manufacturing method, including engraving, screen printing, ink jet printing, or otherwise.

It is another aspect of the present invention to offer customization and/or bespoke services from product design to manufacturing to after-purchase support.

It is still another aspect of the invention to improve and simplify the manufacture of engraved jewelry and other objects in which images are engraved.

It is yet another aspect of the invention to provide an easy to use and accurate means of customer interaction with the system.

It is still another aspect of the invention to provide a method for the customer to select and authenticate information to be engraved on a user indicated surface.

it yet another aspect of the invention to create finished consumer items which require little or no manual work post manufacture, allowing the end product to be shipped directly from the engraving location to the customer.

It is still another aspect of the invention to provide a method for the customer to edit the selected image files (e.g., a map of a significant location, an image of an important landmark, a memorable saying, etc.) to adapt them as desired and/or for the particular objects to be engraved.

The above and other aspects, features and advantages of the present invention will become apparent to anyone skilled in the art from the following description read in conjunction with the accompanying drawings, in which like reference numerals designate the same elements, but shall not be limited to the figures, features, or other descriptions disclosed.

BRIEF DESCRIPTION OF THE DRAWINGS

A further understanding of the present invention can be obtained by reference to a preferred embodiment set forth in the illustrations of the accompanying drawings. Although the illustrated preferred embodiment is merely exemplary of methods, structures and compositions for carrying out the present invention, both the organization and method of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention. For a more complete understanding of the present invention, reference is now made to the following drawings in which:

FIG. 4 illustrates an exemplary screen shot of a website or web portal as part of the method and system for the user/customer driven selection, design, purchase and sale of a jewelry item in accordance with the invention.

FIGS. 9A-E shows a selection of exemplary jewelry items and the customized features thereon manufactured in accordance with the system of the present invention.

DETAILED DESCRIPTION OF THE PREFERRED EMBODIMENTS

Figure 1:
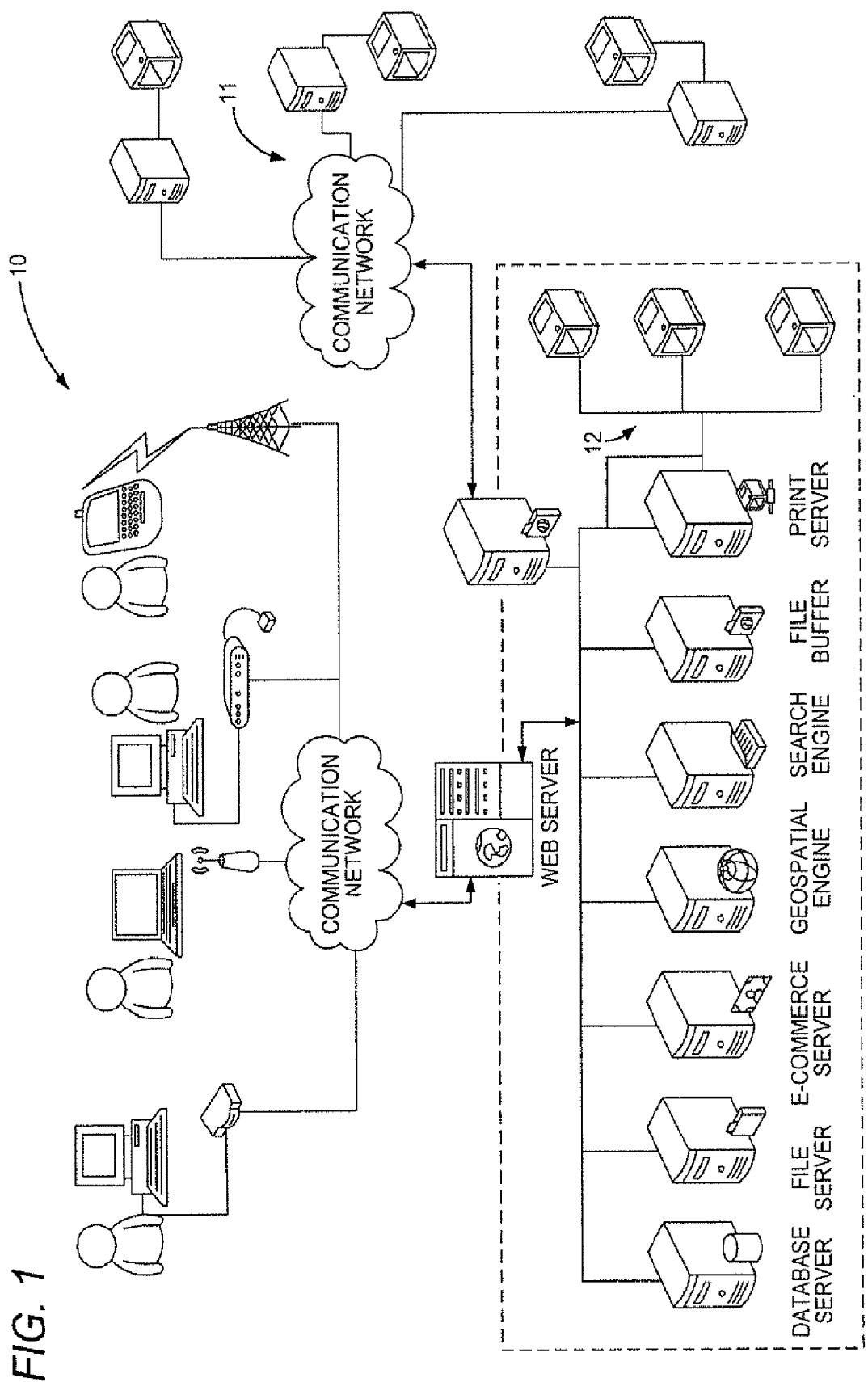
FIG. 1 shows a diagrammatic representation of a preferred embodiment of a computer system/network for the retrieval of information from a database for the design, selection, and creation of a customized jewelry item according to the invention.

As required, a detailed illustrative embodiment of the present invention is disclosed herein. However, techniques, systems, compositions and operating structures in accordance with the present invention may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, below, etc., or motional terms, such as forward, back, sideways, transverse, etc. may be used with respect to the drawings. These and similar directional terms should not be construed to limit the scope of the invention in any manner.

Referring first to FIG. 1, shown is a diagrammatic representation of a preferred embodiment of a computer system/network 10 for the retrieval of information from a database for the design, selection, and creation of a customized jewelry item according to the invention. In network 10, a computer comprises a central processing unit (CPU) with process controller(s) and main memory. The computer is connected to an input/output (I/O) system and disk storage unit. Optionally, the I/O system includes a display, a keyboard and a mouse. Furthermore, this computer system 10 is connected to a variety of networks for communicating with other computers and obtaining access to remote databases and communication nodes. Among the networks optionally connected to this computer system 10, without limitation, is the worldwide web, an intranet, virtual private networks (VPN) and private external network (PEN). In general, the disk storage unit stores the program for operating the computer system and it stores the documents of the database. The computer interacts with the I/O system and the disk storage unit. The computer executes operations according to instructions contained in a program that is retrieved from the disk storage unit. A user interacts with the program to cause the computer to select a consumer item for indicia content in an indicial surface, to create a user designated indicial content (e.g., jewelry design, textile design, etc. without limit), or parts thereof, which is then stored in a database located either in disk storage or in a storage location accessible over a network. Instructions to the computer also cause information to be received over a network or to be distributed to specific individuals or manufacturing locations over a network. In this way, information used in creating jewelry designs can be accessed or displayed remotely.

Also illustrated by FIG. 1 are network diagrams of embodiments of the present invention, wherein the illustrations depicts how a user, using a computer of varying forms including a PC, a notebook, or a smart phone or other device can connect to the system of the present invention through a router, a wireless access point, a modem or a wireless network such as a CDMA network. The illustrations of various connectivity methods are intended to be illustrative instead of restrictive in nature. The connectivity methods described thus far allow a plurality of users/customers to access the system through a communication network and connect to a web server. The web server is shown connected to a plurality of servers including a database server, a file server, an e-commerce server, a content management server, a directory server, an FTP server, a print server, and a proxy server with or without a firewall. System 10 also has access to a plurality of database providers 12, for example storing geospatial details, material requirements, consumer histories, or other data needed for a function of system 10.

The system is also, in the embodiment presented, and connected, through a network connection, to a remote array of servers, wherein each remote location contains additive fabrication hardware, generally at 11. The remote additive fabrication hardware may be contained in a bureau or factory or an individual's home including the home of someone accessing the system such that the printed product is printed in the same geographical location as the user/customer. The various servers are presented in this format to illustrate the system deploying the method may be diverse depending upon the desired content, desired indicia, and desired product for the indicia surface, and are not intended to be inclusive. Furthermore, the servers presented may be virtual or contained in a single server or servers located in the same location or distributed to multiple locations geographically.

Figure 2:
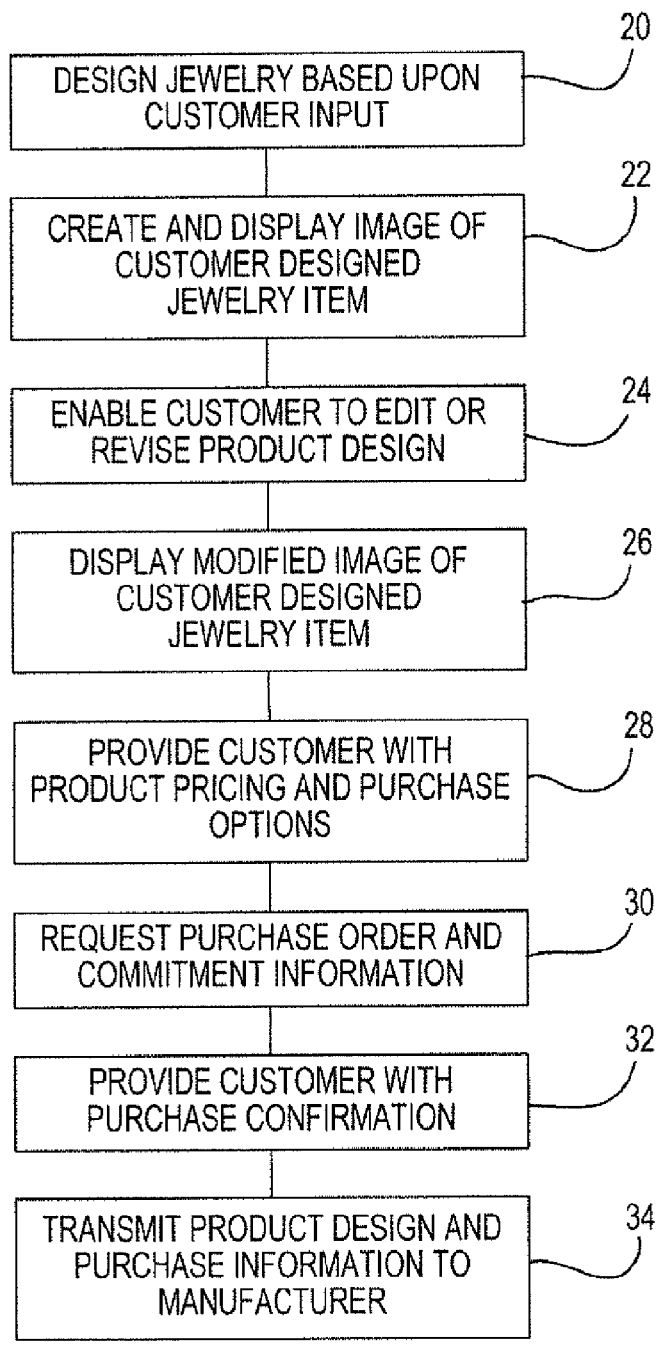
FIG. 2 shows a block diagram illustrating an embodiment of a method of customized or bespoke jewelry design and manufacturing according to at least some of the inventive principles of the present invention.

Turning next to FIG. 2, shown is a block diagram illustrating an embodiment of a method of customized or bespoke jewelry design and manufacturing according to at least some of the inventive principles of the present invention. According to the invention, this method may be implemented, for example, using the system of FIG. 1. Beginning at 20, a user designated consumer item having an indicia surface (here a jewelry item), for example, a seen in the selection of exemplary jewelry items and the customized features thereon illustrated in FIGS. 8A-E, preferably to include a colored gemstone, is designed remotely from a computer (i.e., home computer, office computer, smart phone or other mobile device) or locally at a retail location according to a consumer's input. At 22, the item's image is displayed for the consumer while the consumer is still on the web portal or website, or still at the retail location. The system then enables the customer to edit or revise the item's design at 24. A variety of design options may be provided based upon a base design for the item, including any type of indicia content, custom indicia designation, or combination of alternative indicia content designations. At 26, the item's revised image is displayed for the consumer while the consumer is still on the web portal or website, or still at the retail location. This review and redesign may continue until the customer is satisfied with the design. Overall, this process of a user selected consumer item having an indicia surface and the process of designating indicia content forms a mask detail, which includes minimum margin information and other information unique to the particular consumer item (e.g., jewelry item, textile item, electronic item etc.), all sufficient for the consumer to designate their desired indicia content in any form. Once accepted, at 28 the customer may be provided with one or more pricing and purchase options, whereupon the customer at 30 is requested to place a purchase order, which is a commitment to purchase the customized jewelry item. After the customer makes her purchase selection, at 32 the customer is provided with a purchase confirmation, whereupon at 34 the order information (i.e., the design specifications and mask details, etc.) are exported or transmitted to the intended manufacturing entity in a suitable compatible form, including for example DXF (Drawing Interchange Format) for the creation of suitable detailed manufacturing, vector files, or other manufacturing files. It is understood, that the present system, during the process of user-interface and creation of the mask details by the customer/consumer via an API (Application Programming Interface) and the UI (User Interface) that the system is directly preparing a suitable Export File (DXF) information for direct control of the manufacturing process without further user interaction or later further conversion or revision at the fabrication location (manufacturer). There is direct creation upon the purchase of the manufacturing instruction by the consumer and the transformation of the mask details (indication content control) into the necessary manufacturing instructions. The sequence of steps may be rearranged, and some of the steps may be repeated until the consumer is satisfied with the design and a commitment to purchase is secured.

Figure 3:
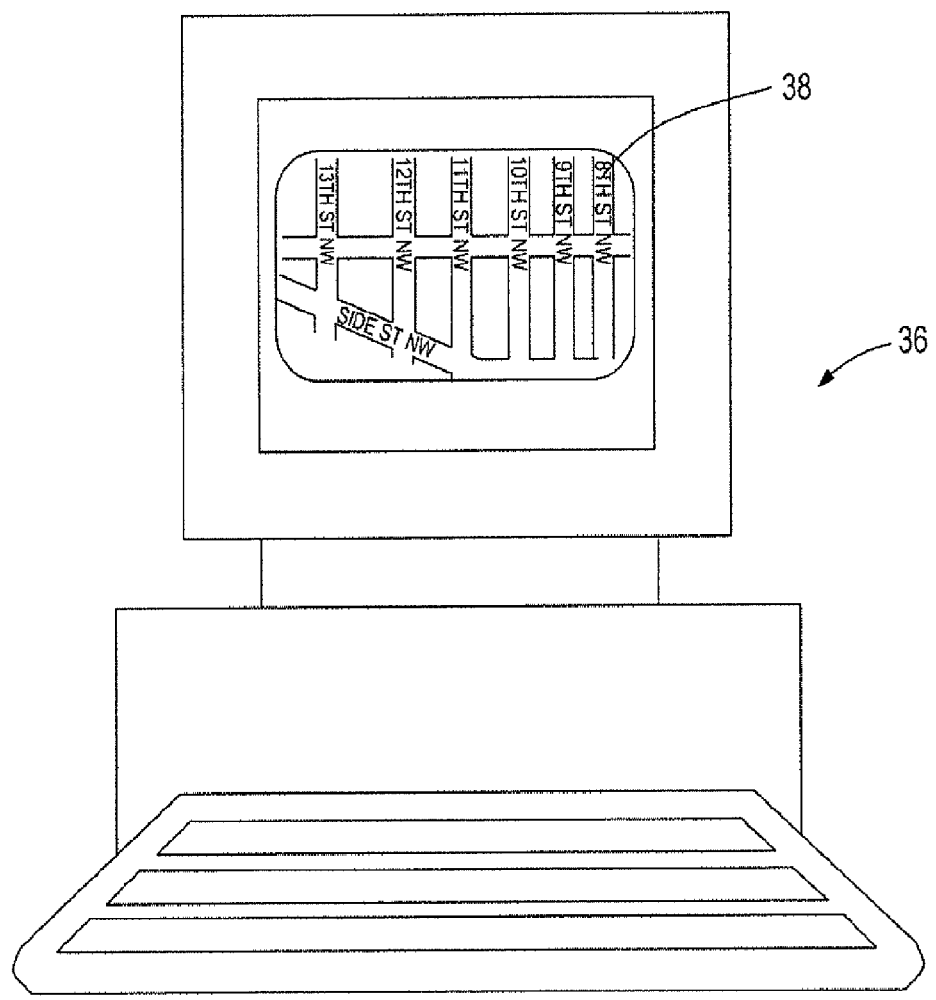
FIG. 3 shows the display of a custom designed jewelry item created by the customer according to the system and method of the present invention.
Figure 4:
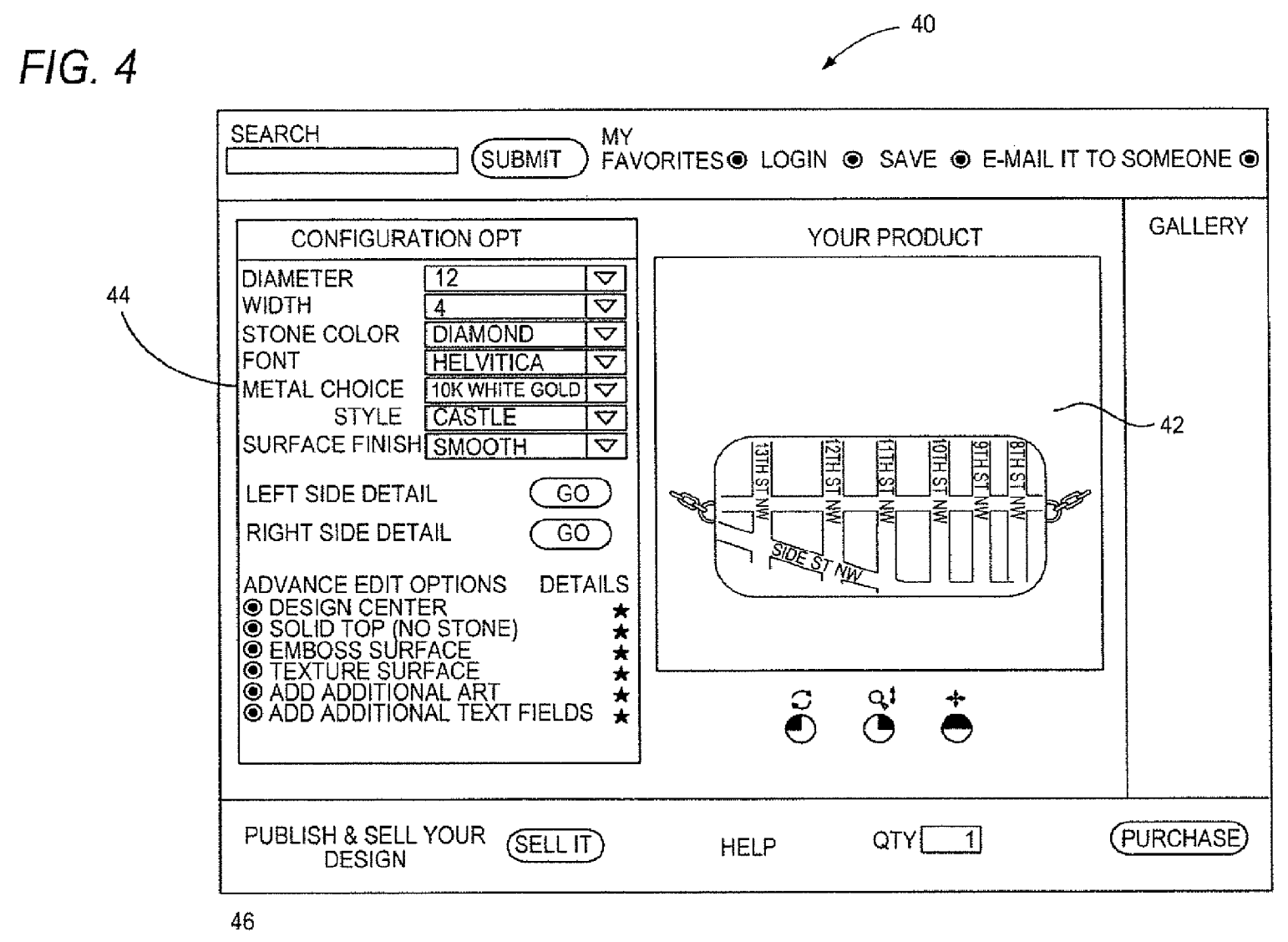

Referring now to FIG. 3, represented is a computer system 36, which may be referred to by someone skilled in the art as a computer aided design or geospatial design and configuration system 36 which, for the intent of disclosure, is intended to be defined as a means to design a product 38 which may be made available for customization/personalization within the present invention. In one embodiment, the system 36 deploying the method of the present invention, shall allow for the input of a design produced in a plurality of design software tools provided to the user via an interface or module. The present invention therefore can accept and utilize the design created at the computer system 36 by an interface or module. A website accessed by the system 36 deploying the present invention is also provided. An exemplary illustration shown in FIGS. 4-5 reflects a user interface (UI) website 40 making available for sale custom jewelry (or other consumer product indicia select as noted elsewhere). This representative website or web portal 40 provides the link between a plurality of customers, the database(s) of product(s) available for customization, the viewer system, the geospatial engine system, the database system and the production system for manufacturing custom jewelry products 38. As depicted, the website 40 may provide various options, including but not limited to configuration options 44, purchase option 48, publication & sale option 46, etc. The website 40 also enables the user to view the designed product 42 along the way in order to assess each revision to the design being created. It will be apparent that the limitations on what can be manufactured using this method and system as described herein are defined by the materials available.

The depicted web portal is usable for the custom design of a jewelry product, whereby the customer drives the selection and assembly of the product with chosen options and includes the ability to use the design interface presented to the user/customer to add pictures which are converted through methods including but not limited to displacement mapping. The interface can also enable the customer to see the resultant of the customization/personalization.

Figure 5:
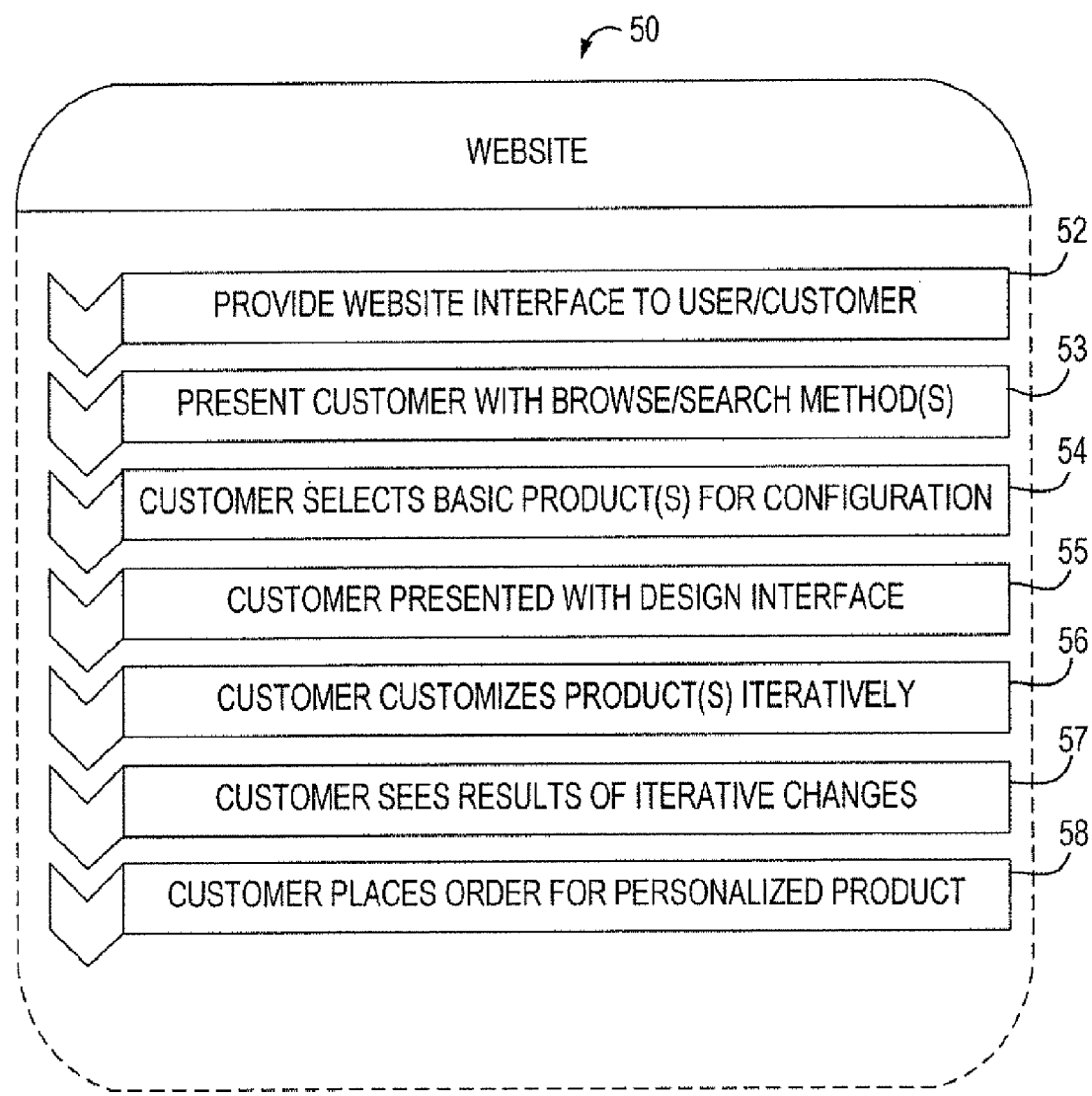
FIG. 5 depicts an embodiment of a web portal or website in accordance with the automated system and method for the customization of fashion or jewelry items in accordance with the present invention.

As depicted in FIG. 5, an embodiment of a web portal or website in accordance with the automated system and method for the customization of fashion or jewelry items may comprise a series of steps or options 50. The system may provide a website interface to the customer (52). Illustrated is an embodiment of a method for using a website or web portal providing connectivity between a user/customer and the system deploying the method of the present invention, wherein the website or web portal provides a means for the user/customer to access the system and for the system to provide feedback to the user/customer, creating an interactive mask creation system for full designation of a user designed indicia content on a desired indicia surface. As used herein, the terms communication network and Internet refer to any networking method that provides a user/customer access to the system described herein from a remote geographical location. The communication network providing two-way data communication between the user/customer accessing a website or web portal located on the World Wide Web which interfaces with said system.

In one embodiment, the website provides by the current invention includes multiple web pages, collectively comprising a website, with a home page whose meaning is clear to anyone skilled in the art of the internet and e-commerce for creation of communication, ordering, purchasing, banking and payment, or other feature of electronic commerce. The website is accessible by a web browser in response to a user/customer http request resulting in the presentation of the website through its URL by which all web pages are categorized, organized and located on the internet. A user/customer as described herein can include any person who accesses a website on the internet for the purpose of gathering information, learning, experiencing or purchasing by e-commerce. This description is extended to users who may be involved in collaborative design efforts. The terms described here are provided to represent, rather than limit, the terms describing a user/customer.

The website or web portal depicted in FIG. 5 is designed to provide users desiring to customize for the intent of purchase, personalized or customized products. The website further contains one or methods to browse and or search for products contained in the system to customize or personalize and purchase 53. The website or web portal may further provide the user with an interface to select basic product(s) for configuration 54 and/or may present customer with design interface 55. The website or web portal further provides the means by which the user may access the system that provides the user an interface through which they may personalize or customize indicia aspects of a desired consumer product 56 including but not limited to; color, shape, texture, function, thermal, mechanical, electrical properties, etc., affixed to a core product, including text, fonts, scale, cursive, language, or other parameters of text which may be manipulated. Product manipulation and design parameters are intended to mean any user modification which is feasible via design modifications to a consumer, object which does not violate its fit, form or function. Furthermore, product manipulation and modifications refer to any design detail or modification that augment or enhance the original product to meet an individual or personal need or desire. Individual or personal enhancements may also include user/customer original design modifications by someone skilled in the art of design and design implementation so as to create undefined enhancements to a product or an entirely new product design having the same purpose or an entirely new purpose.

The website or web portal of FIG. 5 also includes the ability to include rendering models to a user/customer 57 allowing the customer to see the closest approximation of the actual physical product that is superior to all other visualization methods because the entity they visualize is in fact the digital representation of their actual product (e.g., final product view via the mask details). A computer or computers deploying the method and system of the invention may include any computer system as commonly understood by anyone familiar with the common definition of a computer including computer systems with processor(s), temporary and permanent storage mediums, input/output controls, network connectivity and an operating system. Furthermore, the computer(s) contain programming code in any known explicit or implicit method whereby the code described is responsible for, solely, or in combination with hardware, causing the computer(s) and manufacturing instructions via the exported file parameters (noted above preferred as DXF type or other vector-containing file types, but not limited thereto) to carry out operations to provide the method of the present invention described herein. The software and or hardware clearly understood to carry out the purpose as defined to anyone skilled in the art of computers and networking. The website or web portal of FIG. 5 may also provide an interface through which the customer may place an order for a personalized product 58.

A distinction may be made between a computer or computers carrying out systems and methods usable within the scope of the present invention and a user/customer computer, whereby a user/customer accesses the computer or computers carrying out, by way of computer software and hardware, the methods of the present invention. A user/customer computer can include a PC, Smartphone, home computer, desktop computer, notebook computer, tablet PC or combination thereof, as seen and suggested in FIG. 1.

Figure 6:
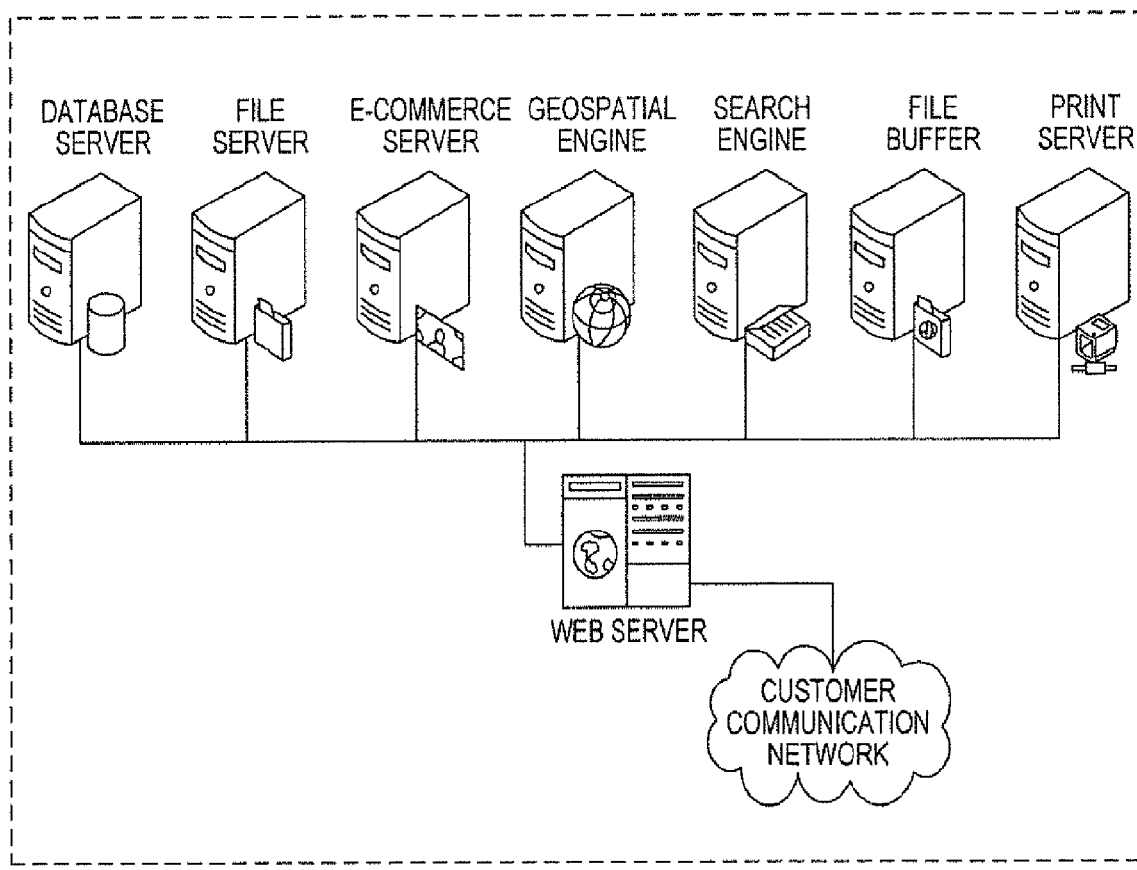
FIG. 6 depicts a computer-based system for carrying out a preferred embodiment of the method according to the invention.

Referring next to FIG. 6, depicted is an exemplary and optional computer-based system 60 for carrying out a preferred embodiment of the method according to the invention and linking with the Web Server as shown in FIG. 1 for inter-communication. The computer-based system 60 runs on a computer server or computer servers utilizing an operating system. The software/hardware system is programmed to store and retrieve data from a database, present it to a user/customer via the website or web portal, along with a design interface and a view of the product. The software system is also responsible for the sorting, scheduling and routing of a plurality of orders processed through the system by a plurality of users/customers. Furthermore the system is responsible for sorting, routing, nesting and scheduling said product(s) for production only after payment is received and customer approval of the product visualized through the web site or web portal. The system provides for iterative design feedback prior to approval and production. It should be obvious to anyone skilled in the art that the system could be deployed in manners which negate the need for pre-payment prior to production. For example: in delivering an order of a product to a business client who purchases on a purchase order or where no payment is required such as battlefield forward manufacturing or where the order is a repeat order.

The system according to the invention is preferably a scalable, self contained product integrating all of the various components of the system described, for the purpose of developing, producing and making for sale products to users/customers through the automation of the system, thereby providing a system with productivity advantage, pre-purchase visualization advantage, operational advantage, inventory advantage, order accuracy advantage, and labor productivity advantage.

The system may also support a consumer product selection and indicia design mobile application (for example a jewelry design mobile application). A jewelry customer accesses a mobile device, such as a tablet computer, at a jewelry store, home, or other locations. The jewelry customer may include an end-user, a sales professional, or a retailer. Many suitable mobile devices may be suitably used with the system besides a tablet computer, such as a handheld device, handheld computer, personal digital assistant, smart phone, a mobile phone, or a convertible notebook computer. The mobile device is coupled to the Internet to facilitate communication with a jewelry application server. The jewelry application server has access to the inventory of jewels and jewelry of one or more jewelry merchants as well as databases and servers that support a mobile application (not shown) executing on the mobile device. Orders for jewels or jewelry made on the mobile device are filled by fulfillment operations. The fulfillment operations communicate with a logistics server to arrange transportation of ordered jewels or jewelry to the jewelry customer wherever she may be.

Executing on the mobile device is a mobile application for viewing jewelry, virtually arranging jewelry, and ordering jewelry. The mobile application may be downloaded to the mobile device via the Internet, or may access a piece of temporary software executing at a remote web site. In all embodiments of the mobile application, the jewelry customer may arrange jewelry and order these jewelry arrangements instead of ordering pre-arranged jewelry. Such an order may be made with a press of a button provided on the mobile application.

Because the jewelry customer may want to inspect multiple jewelry arrangements, a comparison feature is available on the mobile application to allow the jewelry customer to compare one arrangement with another arrangement. Among many other features, the mobile application provides an appraisal functionality as well as order tracking in real time of the shipment of placed orders for jewelry. In one embodiment, order transactions are suitably made to a selected or preferred store merchant of the jewelry customer. In such an embodiment, the jewelry customer establishes an account with her preferred store merchant, and such an account is used to place the order for the jewelry. Another option that the customer may select on the mobile application is to indicate whether an ordered arrangement is to be picked up at a preferred store merchant or shipped to her residence or office.

Figure 7:
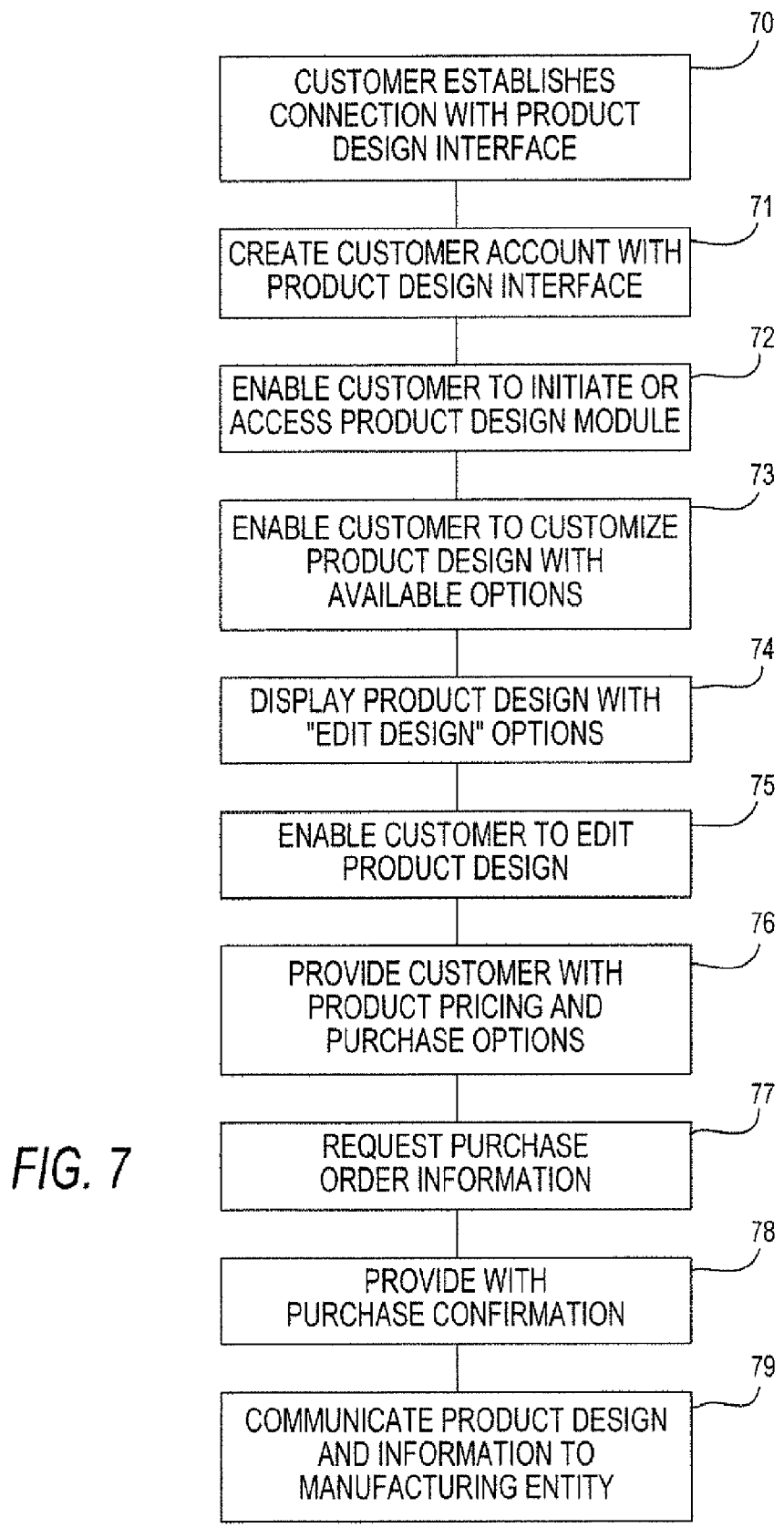
FIG. 7 is a flow diagram illustrating an alternative embodiment of a method of creating user designated indicia content on a designated indicia surface through an ordering an purchasing process including feature motif options, here using customized or bespoke jewelry design and he inventive principles of the present invention.

Turning last to FIG. 7, shown is a flow diagram illustrating an alternative embodiment of a method of customized or bespoke consumer product (for example jewelry or textile indicia) design and manufacturing according to at least some of the inventive principles of the present invention. According to the alternative embodiment, this method may also be implemented, for example, using the system of FIG. 1. Beginning at 70, a jewelry item, for example, a seen in the selection of exemplary jewelry items and the customized features thereon illustrated in FIGS. 9A-E, preferably to include a colored gemstone, for example a feature motif 90 (see FIG. 9A), is designed remotely from a computer (i.e., home computer, office computer, smart phone or other mobile device) or locally at a retail location according to a consumer's input. At 71, the customer may be prompted to establish a user account with the product design interface or module. The user is then granted access to the product design module 72 to begin designing the customized jewelry item 73. At 74, the initial product image is displayed for the consumer while the consumer is still on the web portal or website, or still at the retail location, along with options for revising or editing the image. The system then enables the customer to edit or revise the item's design at 75. A variety of design options may be provided based upon a base design for the item. The item's revised image is displayed for the consumer while the consumer is still on the web portal or website, or still at the retail location. This review and redesign may continue until the customer is satisfied with the design. Once accepted, at 76 the customer may be provided with one or more pricing and purchase options, whereupon the customer at 77 is requested to place a purchase order, which is a commitment to purchase the customized jewelry item. After the customer makes her purchase selection, at 78 the customer is provided with a purchase confirmation, whereupon at 79 the order information (i.e., the design specifications, etc.) are transmitted to the manufacturing entity. The sequence of steps may be rearranged, and some of the steps may be repeated until the consumer is satisfied with the design and a commitment to purchase is secured.

Figure 8:
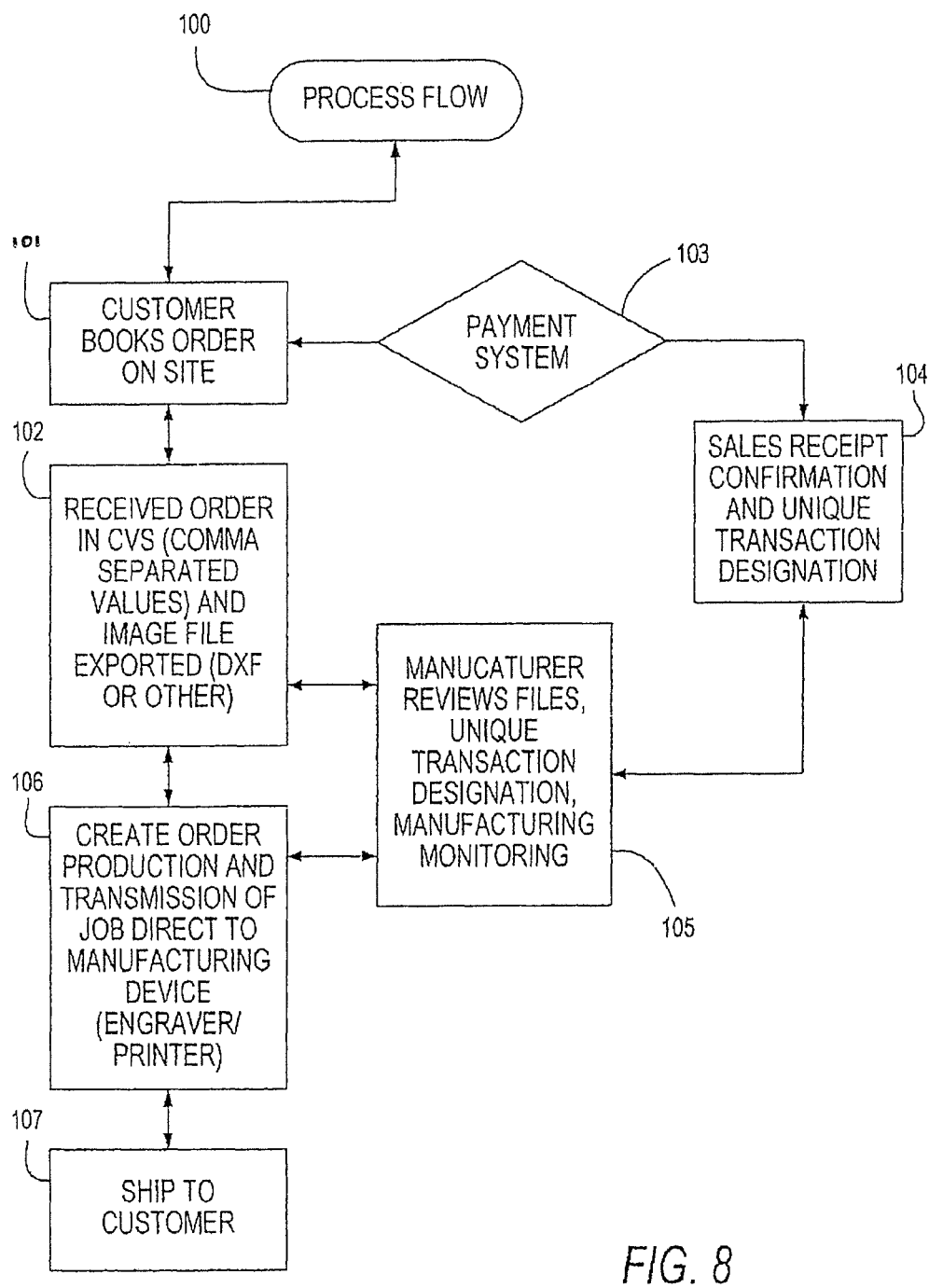
FIG. 8 is an alternative and related flow diagram illustrating an alternative embodiment of a method of creating user designed design indicia content on a designated indicia surface through an ordering and purchasing process and related steps.

Referring additionally now to FIG. 8 is an alternative flow diagram illustrating a related process flow 100 for user designated indicia content on a user designated indicia surface., for example on a jewelry, textile, or other consumer item having a designatable indicia surface. In flow 100, it will be understood that the communications and support systems noted herein will be used for providing user interface, payment, ordering, and other flow steps. In step 101 a customer designates an order on site and in step 102 the provider receives the order with CSV (comma separated values) suitable for database entry and fillment automatically, and mask images, and an auto-created exported file for manufacturing control and direct use on manufacturing equipment (for example a DXF vector control type file) via the user's interaction with the provided API (Applications Programming Interface). In related step 103 payment and banking information is operationally provided and in a related step 104 a sales receipt confirmation and unique transaction designations are created and provided for the user and system. In steps 105 and 106, interconnected with step 102, the manufacturer receives and reviews the file and manufacturing instructions, designates the indicia creating requirements and creates the user designated indicia content and/or feature motif and payment confirmation and shipping (step 107) to client to complete the process flow.

Referring now to FIGS. 9A-9E examples of user designated indicia surfaces are shown on various items, a pendant 84, a description tag 88, a religious medal 82, a celebratory award 86, and a bracelet 80. In one example, a particular additional feature motif 90 (FIG. 9A) is provided with a jewelry item, here a diamond. As will be understood, each of the indicia surfaces contains a number of diverse feature motifs according to a user designation and selection using the proposed system. FIG. 9E is an example of a custom designation of user content in words selected by a user. FIG. 9A is an exemplary geo-location indicia on the surface (e.g., street designations initially selected by a user address or custom designation) and with selected feature motifs (streets) etc. Feature motifs may be any other surface indicia as noted herein.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that such embodiments are merely exemplary and that the invention is not limited to those precise embodiments, and that various changes, modifications, and adaptations may be effected therein by one skilled in the art without departing from the scope or spirit of the invention as defined in the appended claims. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A customer-driven method for designing and producing a customized jewelry item, wherein said method comprises the steps of:
  receiving a selection of a base object from a customer device in communication with a central device;
  displaying on the customer device a base model derived from base data wherein the base model corresponds directly to the base object;
  receiving at least one custom modification to the base model from the customer device, modifying the base data to form modified data, and preparing a modified model corresponding to a modified object determined by the base object as modified by said at least one custom modification;
  displaying the modified model on the customer device, wherein the modified model corresponds directly to the modified object;
  receiving confirmation to produce the modified object from the customer device;
  selecting at least one manufacture of a plurality of manufacturers for receipt of the modified model based on a respective capacity, a quality rating, and a location of said at least one manufacture of the plurality of manufacturers;
  transmitting the modified data directly from the central device to at least one respective manufacturer device associated with said at least one of the manufacturers selected for automatic production of the modified object, using and corresponding directly to the modified data;
  directly obtaining first digital image information concerning a portion of a first person or an animal;
  obtaining further digital image information concerning said portion;
  storing said first and further digital image information in a computer;
  displaying the first digital image information and said further digital image information as displayed images;
  viewing said displayed images and selecting one image for engraving;
  transmitting the displayed image information of the selected image to the further computer;
  creating, by the further computer, a manufacturing file based on the transmitted displayed image information; and
  engraving, by a machine tool executing said manufacturing file, on an object at least a portion of said displayed image information transmitted.

2. A customer-driven system for designing and producing a customized jewelry item, wherein said system comprises:
  a central device having a plurality of base models accessible therefrom, each corresponding to a base object;
  a customer device in communication with the central device;
  a manufacturer device in communication with the central device;
  an interactive design interface associated with the central device, the customer device, or combinations thereof, wherein the interactive design interface comprises computer instructions for permitting selection of a modification to a base model by the customer device;
  imaging computer instructions associated with the central device for producing a modified model corresponding to a modified object using the base model and a selection from the interactive design interface;
  capacity computer instructions for selecting at least one manufacture of a plurality of manufacturers for receipt of the modified model based on a respective capacity, a quality rating, and a location of said at least one manufacture of the plurality of manufacturers;
  confirmation computer instructions associated with the central device for receiving a confirmation of the modified model and transmitting the modified model directly from the central device to the respective manufacturer device associated with said at least one of the manufacturers selected for automatic production of the modified object, corresponding directly to the modified model;
  a further computer for creating a manufacturing file based on the transmitted modified model;
  a machine tool for executing said manufacturing file; and
  a non-transitory computer readable medium storing instructions for engraving graphic material on a face of said jewelry item that, when executed by the system, cause the system to perform operations including:
    directly obtaining first digital image information concerning a portion of a first person or an animal;
    obtaining further digital image information concerning said portion;
    storing said first and further digital image information in a computer;
    displaying the first digital image information and said further digital image information as displayed images;
    viewing sad displayed images and selecting one image for engraving;
    transmitting the displayed image information of the selected image to the further computer;
    creating, by the further computer, a manufacturing file based on the transmitted displayed image information; and
    engraving, by the machine tool executing sad manufacturing file, on an object at least a portion of said displayed image information transmitted.

3. The system according to claim 2, wherein the method further comprises the step of:
  transmitting information concerning said first person to the further computer.

4. The system according to claim 3, wherein the selecting step of the method is made by a second person viewing said image information.

5. The system according to claim 4, wherein the method further comprises the step of:

displaying said image information using said further computer and selecting a portion of said transmitted image to be used in said machine tool program.

6. The method according to claim 1, wherein the at least a portion of said displayed image information is a map of a geographical location.

7. The system according to claim 2, wherein the at least a portion of said displayed image information is a map of a geographical location.

* * * * *